US012794806B2

(12) United States Patent
Xiang

(10) Patent No.: US 12,794,806 B2
(45) Date of Patent: Nov. 10, 2026

(54) METHOD AND APPARATUS FOR TRAFFIC FAST SWITCHOVER

(71) Applicant: New H3C Technologies Co., Ltd., Hangzhou (CN)

(72) Inventor: Xuefeng Xiang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 84 days.

(21) Appl. No.: 18/962,662

(22) Filed: Nov. 27, 2024

(65) Prior Publication Data

US 2025/0310256 A1 Oct. 2, 2025

(30) Foreign Application Priority Data

Mar. 29, 2024 (CN) ......................... 202410382088.1

(51) Int. Cl.
*G06F 15/173* (2006.01)
*H04L 45/00* (2022.01)
*H04L 45/745* (2022.01)

(52) U.S. Cl.
CPC ............ *H04L 45/745* (2013.01); *H04L 45/66* (2013.01)

(58) Field of Classification Search
CPC .............................. H04L 45/745; H04L 45/66
See application file for complete search history.

(56) References Cited

U.S. PATENT DOCUMENTS

2020/0136849 A1* 4/2020 Zhang ................. H04L 12/4633
2021/0160173 A1 5/2021 Biradar et al.
2025/0260613 A1* 8/2025 Warren ............... H04L 41/0654
2025/0300934 A1* 9/2025 Zheng ................... G06F 9/5083

FOREIGN PATENT DOCUMENTS

CN 110417569 11/2019

OTHER PUBLICATIONS

Extended European Search Report issued in corresponding European Application No. 24215774.1, dated May 22, 2025.

* cited by examiner

*Primary Examiner* — Joseph R Maniwang
(74) *Attorney, Agent, or Firm* — NORTON ROSE FULBRIGHT US LLP

(57) ABSTRACT

Disclosed are a method and an apparatus for service fast switchover. The present disclosure may be applied in a spine-leaf architecture, wherein the method may be applied to a backbone spine node. The backbone spine node may loop back a data packet sent through a port connected to a faulty member path from Equal Cost Multi Paths (ECMPs) to which the faulty member path belongs, select one fast switchover member path from the ECMPs prior to routes in a network with the ECMPs converging, determine an access node connected to the fast switchover member path as a next hop, perform layer 3 forwarding on the data packet and encapsulate a specified Media Access Control, MAC, address as a destination MAC address, and send the data packet, with the specified MAC address as the destination MAC address, to the next hop through the fast switchover member path.

10 Claims, 3 Drawing Sheets

METHOD AND APPARATUS FOR TRAFFIC FAST SWITCHOVER

CROSS-REFERENCE TO RELATED APPLICATIONS

This application claims priority to Chinese Application No. 202410382088.1, filed Mar. 29, 2024, which is incorporated into the present application by reference.

TECHNICAL FIELD

The present disclosure relates to communication technology, specifically to a method and apparatus for traffic fast switchover.

BACKGROUND

In the Spine-Leaf architecture of a data center, both Spine nodes and Leaf nodes are Layer 3 switching devices. Through routing protocols such as OSPF or EBGP, Equal Cost Multi-Paths (ECMPs) load balancing and link backup are achieved between Spine devices and Leaf devices.

In the Spine-Leaf architecture shown in FIG. 1, when there is a path failure between node Spine11 and node Leaf3, and terminal T1 is sending traffic to terminal T2, if the link between node Spine11 and node Leaf3 fails, the traffic between terminal T1 and T2 will be interrupted. The service will need to wait for route convergence within the network, and then node Leaf2 will switch the route to terminal T2 to the next hop, which is Spine12, based on the converged route. During the process of route convergence, the traffic between terminal T1 and T2 may be interrupted for several seconds, affecting the user's service experience.

SUMMARY

The purpose of the present disclosure is to provide a method and apparatus for traffic fast switchover, achieving high reliability in fast traffic switchover.

To achieve the above objective, the present disclosure provides a method for traffic fast switchover, which is applied to a backbone spine node in a Spine-Leaf architecture. The method includes: looping back a data packet sent through a port connected to a faulty member path from Equal Cost Multi Paths (ECMPs) to which the faulty member path belongs; selecting one fast switchover member path from the ECMPs prior to routes in a network with the ECMPs converging; determining an access node connected to the fast switchover member path as a next hop; performing Layer 3 forwarding on the data packet and encapsulating a specified Media Access Control (MAC) address as a destination MAC address; and sending the data packet with the specified MAC address as the destination MAC address to the next hop through the fast switchover member path.

To achieve the above objective, the present disclosure provides an apparatus for traffic fast switchover, which can be applied as a backbone spine node in a Spine-Leaf architecture. The apparatus includes a processor and a non-transitory machine-readable storage medium storing machine-executable instructions executed by the processor. The processor executes the machine-executable instructions to perform the following processing: looping back a data packet sent through a port connected to a faulty member path from Equal Cost Multi Paths (ECMPs) to which the faulty member path belongs; selecting one fast switchover member path from the ECMPs prior to routes in a network with the ECMPs converging; determining an access node connected to the fast switchover member path as a next hop; performing Layer 3 forwarding on the data packet and encapsulating a specified Media Access Control (MAC) address as a destination MAC address; and sending the data packet with the specified MAC address as the destination MAC address to the next hop through the fast switchover member path.

To achieve the above objective, the present disclosure provides a method for traffic fast switchover, which is applied to an access leaf node in a Spine-Leaf architecture. The method includes: receiving a data packet with a destination MAC address being a specified MAC address through a member path; selecting one fast switchover member path from ECMPs to which the member path belongs; determining a backbone node connected to the fast switchover member path as a next hop; performing Layer 3 forwarding on the data packets and encapsulating a MAC address of the next hop as a new destination MAC address; and sending the data packet with the new destination MAC address to the next hop through the fast switchover member path.

To achieve the above objective, the present disclosure provides an apparatus for traffic fast switchover, which can be applied as an access leaf node in a Spine-Leaf architecture. The apparatus includes a processor and a non-transitory machine-readable storage medium storing machine-executable instructions executed by the processor. The processor executes the machine-executable instructions to perform the following processing: receiving a data packet with a destination MAC address being a specified MAC address through a member path; selecting one fast switchover member path from ECMPs to which the member path belongs; determining a backbone node connected to the fast switchover member path as a next hop; performing Layer 3 forwarding on the data packets and encapsulating a MAC address of the next hop as a new destination MAC address; and sending the data packet with the new destination MAC address to the next hop through the fast switchover member path.

The beneficial effect of the present disclosure is that prior to routes in the network of a spine-leaf architecture converging, the routes are in processes of convergence, the packet sent through the faulty member path of the ECMPs can be quickly switched to other member paths, ensuring high reliability requirements for the traffic provided by the network.

DETAILED DESCRIPTION

Detailed explanations will be provided through multiple examples illustrated in the accompanying figures. In the following detailed description, numerous specific details are used to provide a comprehensive understanding of the present disclosure. Known methods, steps, components, and circuits are not described in detail in the examples to avoid obscuring the understanding of these examples.

In the terminology used, the term "including" means including but not limited to; the term "containing" also means including but not limited to; the terms "above," "within," and "below" include the referenced number itself; the terms "greater than" and "less than" do not include the referenced number. The term "based on" indicates being based on at least a part of it.

Figure 1:
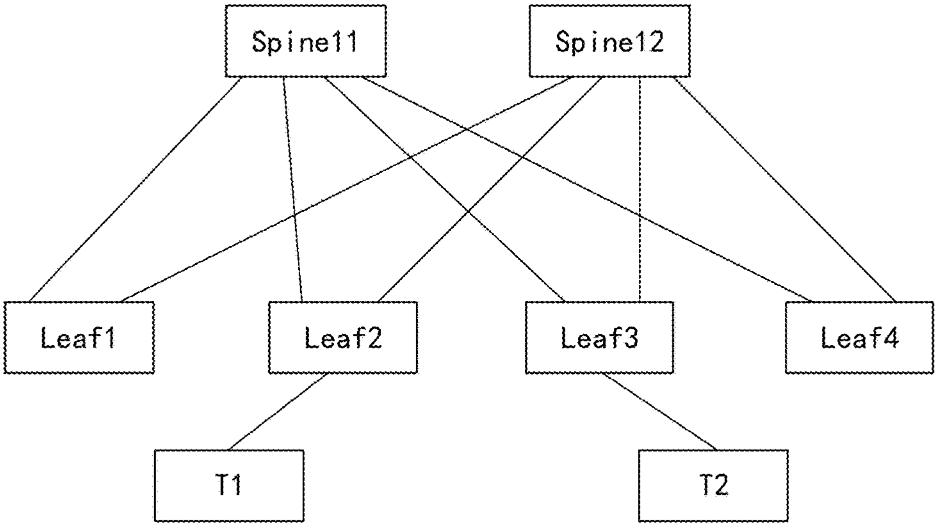
FIG. 1 is a block diagram illustrating a network of a spine-leaf architecture.
Figure 2:
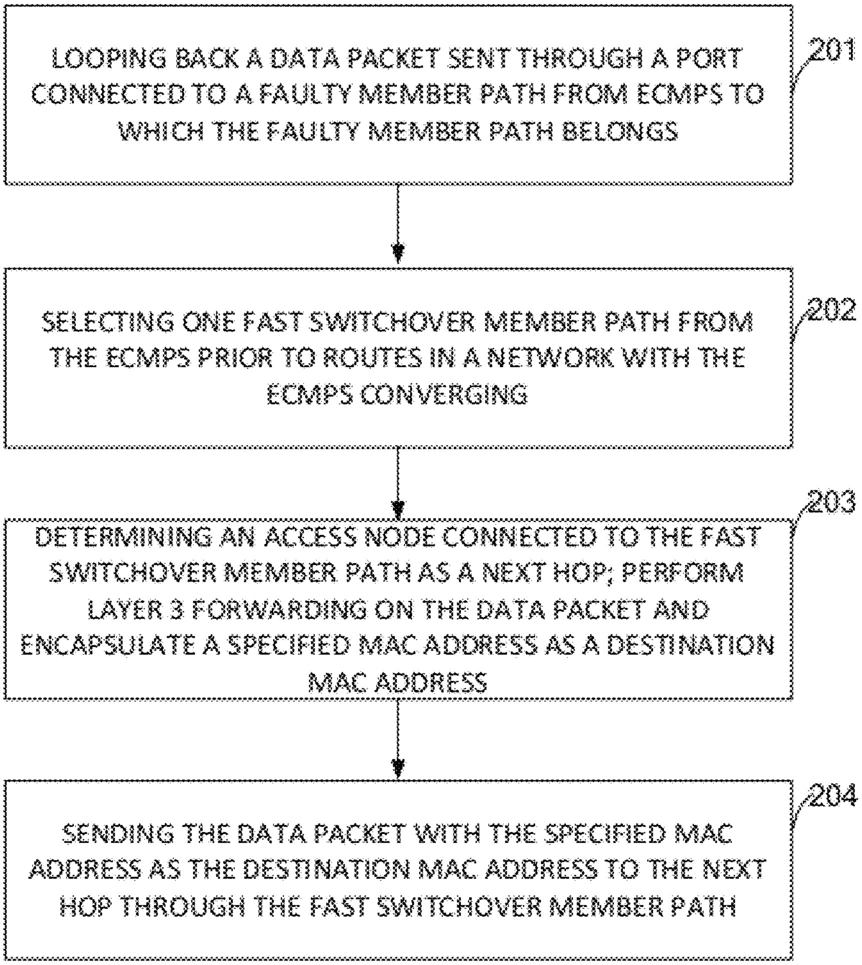
FIG. 2 is a block diagram illustrating an exemplary method for traffic fast switchover in accordance with an example of the present disclosure.

FIG. 2 is a block diagram illustrating an exemplary method for traffic fast switchover in accordance with an example of the present disclosure. The processes shown in FIG. 2 are as follows:

Process 201: looping back a data packet sent through a port connected to a faulty member path from ECMPs to which the faulty member path belongs.

Process 202: selecting one fast switchover member path from the ECMPs prior to routes in a network with the ECMPs converging.

Process 203: determining an access node connected to the fast switchover member path as a next hop; perform Layer 3 forwarding on the data packet and encapsulate a specified MAC address as a destination MAC address.

Process 204: sending the data packet with the specified MAC address as the destination MAC address to the next hop through the fast switchover member path.

The beneficial effect of the example shown in FIG. 2 it that, prior to routes in the network of a spine-leaf architecture converging, the routes are in processes of convergence, the packet sent through the faulty member path of the ECMPs can be quickly switched to other member paths, ensuring high reliability requirements for the traffic provided by the network.

Figure 3A:
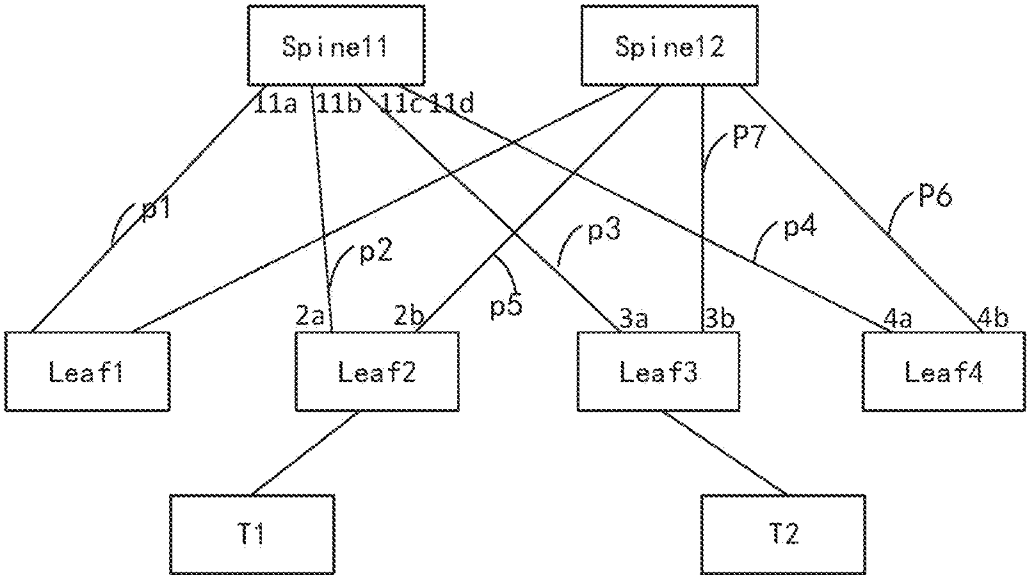
FIGS. 3A-3B are block diagrams of traffic fast switchover under the spine-leaf architecture in accordance with an example of the present disclosure.
Figure 3B:
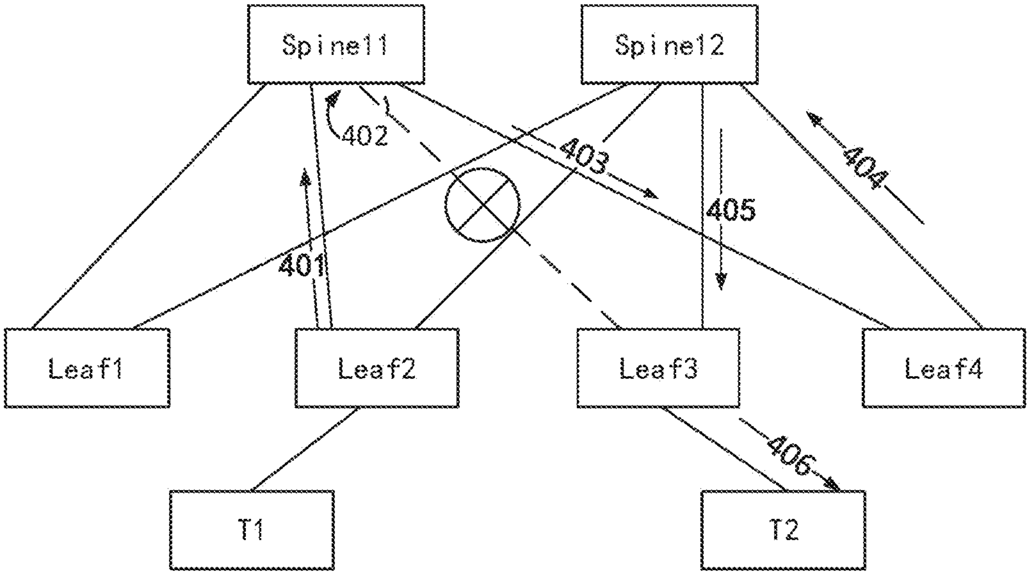

FIGS. 3A-3B are block diagrams of traffic fast switchover under the spine-leaf architecture in accordance with an example of the present disclosure. In FIG. 3A, taking node Spine11 as an example, ports 11*a*, 11*b*, 11*c*, and 11*d* of the node Spine11 are respectively connected to member paths p1-p4 of ECMPs.

The node Spine11 may setup fast switchover ECMPs for the member path P1 connected to the port 11*a*, and configure the member paths P2, P3, and P4 connected to the ports 11*b*, 11*c*, and 11*d* respectively as fast switchover member paths. The node Spine11 may set MAC addresses of three next-hop leaf nodes leaf2, leaf3, and leaf4 for the fast switchover member paths P2, P3, and P4 of the fast switchover ECMPs of the member path P1 to a specified MAC address, such as an anycast MAC address.

The node Spine11 may setup fast switchover ECMPs for the member path P2 connected to the port 11*b*, and may configure the member paths P1, P3, and P4 connected to the ports 11*a*, 11*c*, and 11*d* respectively as fast switchover member paths. The node Spine11 may set MAC addresses of the three next-hop leaf nodes leaf1, leaf3, and leaf4 for the fast switchover member paths P1, P3, and P4 of the fast switchover ECMPs of the member path P2 to the anycast MAC address.

The node Spine11 may setup fast switchover ECMPs for the member path P3 connected to the port 11*c*, and may configure the member paths P1, P2, and P4 connected to the ports 11*a*, 11*b*, and 11*d* respectively as fast switchover member paths. The node Spine11 may set the MAC addresses of the three next-hop leaf nodes leaf1, leaf2, and leaf4 for the fast switchover member paths P1, P2, and P4 of the fast switchover ECMPs of member path P3 to the anycast MAC address.

The node Spine11 may setup fast switchover ECMPs for the member path P4 connected to the port 11*d*, and may configure the member paths P1, P2, and P3 connected to the ports 11*a*, 11*b*, and 11*c* respectively as fast switchover member paths. The node Spine11 may set the MAC addresses of the three next-hop leaf nodes leaf1, leaf2, and leaf3 for the fast switchover member paths P1, P2, and P3 of the fast switchover ECMPs of member path P4 to the anycast MAC address.

The node Spine11 may preset an inactive fast switchover, Access control List, ACL, entry for member path P1, where a match item comprises that an ingress port is the port 11*a*, and an action item is to send through the fast switchover ECMPs of the member path P1.

The node Spine11 may preset an inactive fast switchover ACL entry for the member path P2, where a match item comprises that an ingress port is the port 11*b*, and an action item is to send through the fast switchover ECMPs of the member path P2.

The node Spine11 may preset an inactive fast switchover ACL entry for the member path P3, where a match item comprises that an ingress port is the port 11*c*, and an action item is to send through the fast switchover ECMPs of the member path P3.

The node Spine11 may preset an inactive fast switchover ACL entry for the member path P4, where a match item comprises that an ingress port is the port 11*d*, and an action item is to send through the fast switchover ECMPs of the member path P4.

The node leaf2 connects to the node Spine11 through ECMPs, and may setup fast switchover ECMPs for each of the member paths P2 and P5 of the ECMPs. The node Leaf2 may set fast switchover ECMPs for member path P2 with the member path P5 as its fast switchover member path, and may set fast switchover ECMPs for the member path P5 with the member path P2 as its fast switchover member path.

The node Leaf2 may setup a preset fast switchover ACL entry for the member path P2, where a match item comprises the port 2*a* connected to the member path P2 and the specified MAC address i.e. the anycast MAC address, and an action item is to send through the fast switchover ECMPs of member path P2.

The node Leaf2 may setup a preset fast switchover ACL entry for the member path P5, where a match item comprises the port 2*b* connected to the member path P5 and the specified MAC address, and an action item is to send through the fast switchover ECMP of the member path P5.

Based on schemes of the above processes, the node leaf4 may setup fast switchover ECMPs for the member paths P4 and P6 of the ECMPs. The node Leaf4 may set fast switchover ECMPs for the member path P4 with the member path P6 as its fast switchover member path, and may set fast switchover ECMPs for the member path P6 with the member path P4 as its fast switchover member path.

The node Leaf4 may setup a preset fast switchover ACL entry for member path P4, where a match item comprises the port 4*a* connected to the member path P4 and the specified MAC address, and an action item is to send through the fast switchover ECMPs of the member path P4.

The node Leaf4 may setup a preset fast switchover ACL entry for member path P6, where a match item comprises the port 4*b* connected to the member path P6 and the specified MAC address, and an action item is to send through the fast switchover ECMP of the member path P6.

The nodes Spine11 and Spine12 respectively detect each member path of the ECMPs based on a preset link detection period.

In FIG. 3B, the node Spine11 may detect the member path P2 failed and may set the port 11*b*, which is connected to the faulty member path P2, as a loopback interface for internal looping back. This immediately active the fast switchover ACL entry for the member path P2.

Due to route convergence in the network is not completed in the FIG. 3B, a data packet 401 sent from terminal T1 to terminal T2 may arrive at the node Leaf1, the node Leaf1 may select the node Spine11 as a next hop based on a destination IP address of the data packet 401, re-encapsulate a destination MAC address of the received data packet 401 with the MAC address of the node Spine11, and send the re-encapsulated data packet 401 to the node Spine11.

After receiving the data packet 401, the node Spine11 may determine to perform Layer 3 forwarding on the data packet 401, select the node Leaf2 as a next hop based on the destination IP address of the data packet 401, obtain a data packet 402 by re-encapsulating the destination MAC address of the data packet 401 with the MAC address of the node Leaf2, and send the re-encapsulated data packet 402 through the port 11*b*.

The node Spine11 may loop back the data packet 402 through the port 11*b* and find the matched fast switchover ACL entry for the member path P2 based on the port 11*b*, through which the looped back data packet 402 is received. The node Spine11 may perform a hash calculation based on the data packet 402 to obtain a hash value and may select the fast switchover member path P4 from the fast switchover ECMPs of the member path P2 based on the hash value.

The node Spine11 may select the node Leaf4, which is connected to the fast switchover member path P4, as the next hop and perform Layer 3 forwarding on the data packet 402 to obtain a packet 403 by re-encapsulating the destination MAC address of the data packet 402 with a specified MAC address, i.e., the anycast MAC address.

The node Spine11 may send the re-encapsulated data packet 403 to the next hop, the node Leaf4, through the fast switchover member path P4.

The node Leaf4 may find the fast switchover ACL entry for the member path P4 based on the destination MAC address, anycast, of data packet 403 and the receiving port 4*a*. The node Leaf4 may perform a hash calculation to obtain a hash value based on data packet 403 and may select the fast switchover member path P6 from the matched fast switchover ECMPs based on the hash value.

The node Leaf4 may performs Layer 3 forwarding on the data packet 403 to obtain a data packet 404 by re-encapsulates the destination MAC address of data packet 403 with the MAC address of the node Spine12, which is the next hop connected to the member path P6. The node leaf 4 may send the re-encapsulated the data packet 404 to the node Spine12 through the node port 4*b*.

After receiving the data packet 404, the node Spine12 may perform Layer 3 forwarding on the data packet 404 to obtain a data packet 405. The node Spine 12 may find the Leaf3, which is connected to the member path P3, as the next hop based on the destination IP address of the data packet 404, and re-encapsulate the destination MAC address of the data packet 404 with the MAC address of the node Leaf3, which is the next hop connected to the member path P7. The node Spine 12 may send the re-encapsulated data packet 405 to the node Leaf3 through the port connected to the member path P7.

After receiving the data packet 405, the node Leaf3 may perform Layer 3 forwarding on the data packet 405 to obtain a data packet 406. The node leaf3 may find a corresponding MAC address MAC T1 based on a destination IP address of the data packet 405, re-encapsulate the destination MAC address of the data packet 405 with the MAC address MAC T1, and send the re-encapsulated data packet 406 to the terminal T2 through the port connected to a path reaching the terminal T1.

In the present disclosure, if the node Spine11 detects that the faulty member path P3 has recovered, the node Spine 11 cancels the loopback interface setting of the port 11*c* connected to the faulty member path P3 and sets the fast switchover ACL entry for the member path P3 to be inactive immediately, and performs normal Layer 3 forwarding.

The present disclosure enables fast switchover in response to remote faults in a spine-leaf architecture, achieving sub-millisecond fast switchover for the traffic and meeting high reliability requirements in scenarios such as storage, big data, and intelligent computing. It allows for fast switchover of forwarding paths when a member path fails in ECMPs.

Figure 4:
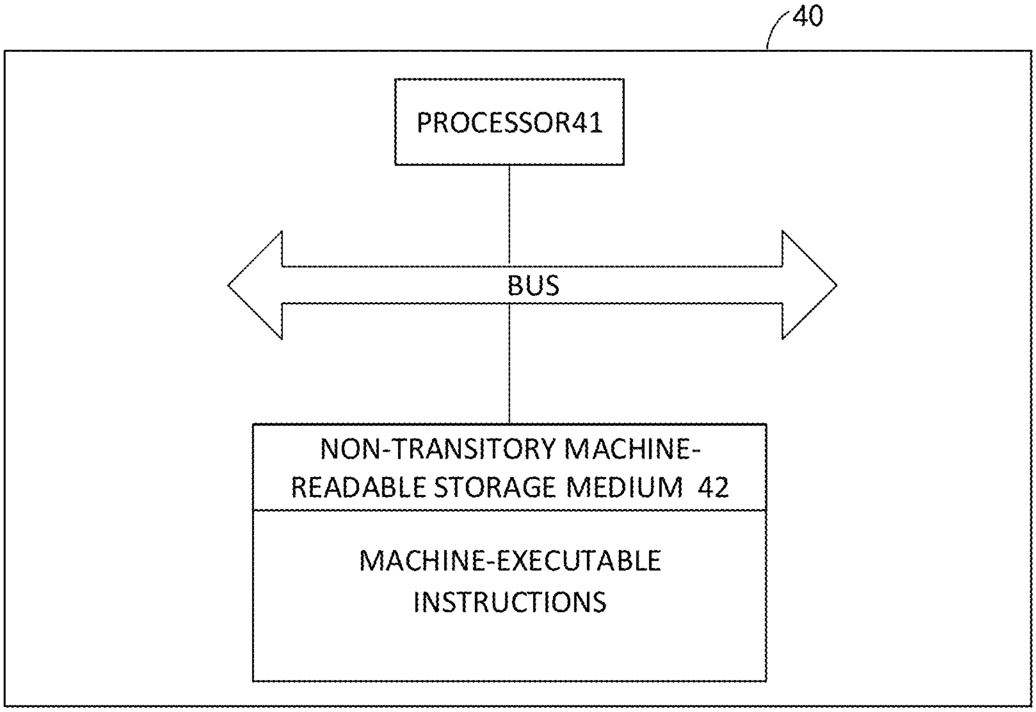
FIG. 4 is a schematic diagram of an apparatus for traffic fast switchover in accordance with an example of the present disclosure.

FIG. 4 is a schematic diagram of an apparatus for traffic fast switchover in accordance with an example of the present disclosure. The apparatus 40 can function as a backbone node within a spine-leaf network architecture. The apparatus 40 includes a processor 41 and a non-transitory machine-readable storage medium 42 storing machine-executable instructions executable by the processor 41.

The processor 41 executes the machine-executable instructions to perform the following processes: looping back a data packet sent through a port connected to a faulty member path from Equal Cost Multi Paths (ECMPs) to which the faulty member path belongs; selecting one fast switchover member path from the ECMPs prior to routes in a network with the ECMPs converging; determining an access node connected to the fast switchover member path as a next hop; performing Layer 3 forwarding on the data packet and encapsulating a specified Media Access Control (MAC) address as a destination MAC address; and sending the data packet with the specified MAC address as the destination MAC address to the next hop through the fast switchover member path.

The processor 41 executes the machine-executable instructions to loop back the data packet sent through the port connected to the faulty member path from the ECMPs to which the faulty member path belongs by detecting each member path of the ECMPs based on a preset link detection cycle; detecting the faulty member path; and configuring the port connected to the faulty member path as a loopback interface for internal looping back.

Prior to executing the machine-executable instructions to loop back the data packet sent through the port connected to the faulty member path from the ECMPs to which the faulty member path belongs, the processor 41 also executes the following processes: configuring each member path of the ECMPs with fast switchover ECMPs that comprise other member paths of the ECMPs; configuring MAC addresses of next hops on the fast switchover member paths in fast switchover ECMPs of each member path as the specified MAC address; and presetting an inactive fast switchover Access Control List, ACL, entry for each member path, where a match item is a port connected to each member path and an action item is to send through the fast switchover ECMPs of each member path.

The processor 41 executes the machine-executable instructions to select one fast switchover member path from the ECMPs prior to routes in the network with the ECMPs converging by immediately activating the fast switchover ACL entry for the faulty member path; finding the fast switchover ACL entry for the faulty member path based on the port connected to the faulty member path; performing a hash calculation based on the data packet to obtain a hash value; and selecting one fast switchover member path from the fast switchover ECMPs of the faulty member path based on the hash value.

The processor 41 executes the machine-executable instructions to also perform the following processes: detecting recovery of the faulty member path; cancelling the loopback interface configuration for the port connected to the recovered member path; and immediately inactivating the fast switchover ACL entry for the recovered member path.

Figure 5:
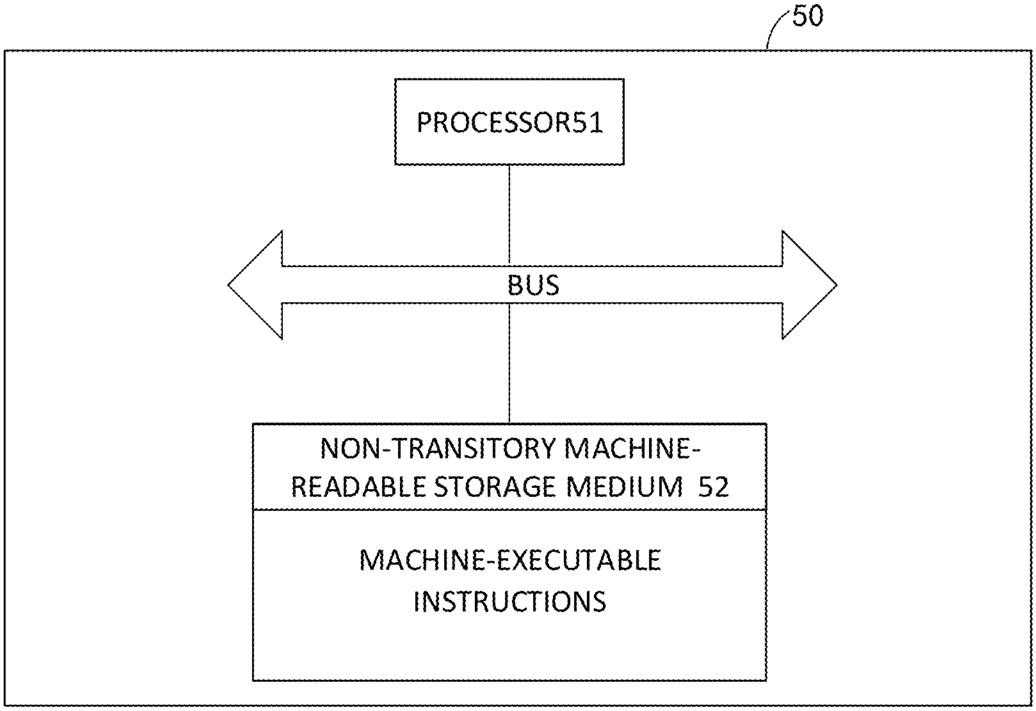
FIG. 5 is another schematic diagram of an apparatus for traffic fast switchover in accordance with an example of the present disclosure.

FIG. 5 is another schematic diagram of an apparatus for traffic fast switchover in accordance with an example of the present disclosure. The apparatus 50 can function as an access node within a spine-leaf network architecture. The apparatus 50 includes a processor 51 and a non-transitory machine-readable storage medium 52 storing machine-executable instructions executable by the processor 51.

The processor 51 executes the machine-executable instructions to perform the following processes: receiving a data packet with a destination MAC address being a specified MAC address through a member path; selecting one fast switchover member path from ECMPs to which the member path belongs; determining a backbone node connected to the fast switchover member path as a next hop; performing Layer 3 forwarding on the data packets and encapsulating a MAC address of the next hop as a new destination MAC address; and sending the data packet with the new destination MAC address to the next hop through the fast switchover member path.

Prior to executing the machine-executable instructions to receive the data packet with the destination MAC address being the specified MAC address through the member path, the processor 51 also executes the following processes: configuring each member path of the ECMPs with fast switchover ECMPs that comprise other member paths of the ECMPs; and presetting a fast switchover ACL entry for each member path; wherein a match item is a port connected to each member path and the specified MAC address; an action item is to send through the fast switchover ECMPs of each member path.

The processor 51 executes the machine-executable instructions to select one fast switchover member path from the ECMPs to which the member path belongs by: finding a fast switchover ACL entry matching a member path connected to a receiving port based on the receiving port and the destination MAC address of the data packet; performing a hash calculation based on the data packet to obtain a hash value; and selecting one fast switchover member path from the matched fast switchover ECMPs based on the hash value.

The above descriptions are merely preferred embodiments of the present disclosure and are not intended to limit the present disclosure. Any modifications, equivalent substitutions, improvements, etc., made within the spirit and principles of the present disclosure should be included within the scope of protection of the present disclosure.

What is claimed is:

1. A method for traffic switchover, comprising:

configuring each member path of Equal Cost Multi Paths (ECMPs) with switchover ECMPs that comprise other member paths of the ECMPs;

configuring Media Access Control (MAC) addresses of next hops on switchover member paths in the switchover ECMPs of each member path as a specified MAC address; and presetting an inactive switchover Access Control List (ACL) entry for each member path, where a match item is a port connected to each member path and an action item is to send through the switchover ECMPs of each member path;

looping back a data packet sent through a port connected to a faulty member path from the ECMPs, to which the faulty member path belongs, comprising: detecting each member path of the ECMPS based on a preset link detection cycle; detecting the faulty member path; and configuring the port connected to the faulty member path as a loopback interface for internal looping back;

selecting one switchover member path from the ECMPs prior to routes in a network with the ECMPs converging;

determining an access node connected to the switchover member path as a next hop;

performing layer 3 forwarding on the data packet and encapsulating the specified MAC address as a destination MAC address; and sending the data packet, with the specified MAC address as the destination MAC address, to the next hop through the switchover member path.

2. The method of claim 1, wherein selecting one switchover member path from the ECMPs prior to routes in the network with the ECMPs converging comprises:

activating the switchover ACL entry for the faulty member path;

finding the switchover ACL entry for the faulty member path based on the port connected to the faulty member path;

performing a hash calculation based on the data packet to obtain a hash value; and selecting one switchover member path from the switchover ECMPs of the faulty member path based on the hash value.

3. The method of claim 2, wherein the method further comprises:

detecting recovery of the faulty member path;

cancelling the loopback interface configuration for the port connected to the recovered member path; and inactivating the switchover ACL entry for the recovered member path.

4. An apparatus for traffic switchover, wherein the apparatus comprises a processor and a non-transitory machine-readable storage medium, wherein the non-transitory machine-readable storage medium has stored therein machine-executable instructions that can be executed by the processor, and the processor executes the machine-executable instructions to implement the following processes:

configuring each member path of Equal Cost Multi Paths (ECMPs) with switchover ECMPs that comprise other member paths of the ECMPs;

configuring Media Access Control (MAC) addresses of next hops on switchover member paths in the switchover ECMPs of each member path as a specified MAC address; and presetting an inactive switchover Access Control List (ACL) entry for each member path, where a match item is a port connected to each member path and an action item is to send through the switchover ECMPs of each member path;

looping back a data packet sent through a port connected to a faulty member path from the ECMPs, to which the faulty member path belongs, comprising: detecting each member path of the ECMPS based on a preset link detection cycle; detecting the faulty member path; and configuring the port connected to the faulty member path as a loopback interface for internal looping back;

selecting one switchover member path from the ECMPs prior to routes in a network with the ECMPs converging;

determining an access node connected to the switchover member path as a next hop;

performing layer 3 forwarding on the data packet and encapsulating the specified MAC address as a destination MAC address;

sending the data packet, with the specified MAC address as the destination MAC address, to the next hop through the fast switchover member path.

5. The apparatus of claim 4, wherein the processor executes the machine-executable instructions to select one switchover member path from the ECMPs prior to routes in the network with the ECMPs converging by:

activating the switchover ACL entry for the faulty member path;

finding the switchover ACL entry for the faulty member path based on the port connected to the faulty member path;

performing a hash calculation based on the data packet to obtain a hash value; and selecting one switchover member path from the switchover ECMPs of the faulty member path based on the hash value.

6. The apparatus of claim 5, wherein the processor executes the machine-executable instructions to also perform the following processes:

detecting recovery of the faulty member path;

cancelling the loopback interface configuration for the port connected to the recovered member path; and inactivating the switchover ACL entry for the recovered member path.

7. A method for traffic switchover, wherein the method comprises:

configuring each member path of Equal Cost Multi Paths (ECMPs) with switchover ECMPs that comprise other member paths of the ECMPs;

presetting a switchover Access Control List (ACL) entry for each member path; wherein a match item is a port connected to each member path and a specified Media Access Control (MAC) address; an action item is to send through the switchover ECMPs of each member path;

receiving a data packet with a destination MAC address being the specified MAC address through a member path;

selecting one switchover member path from the ECMPs to which the member path belongs;

determining a backbone node connected to the switchover member path as a next hop;

performing layer 3 forwarding on the data packet and encapsulating a MAC address of the next hop as a new destination MAC address;

sending the data packet with the new destination MAC address to the next hop through the switchover member path.

8. The method according to claim 7, wherein selecting one switchover member path from the ECMPs to which the member path belongs comprises:

finding a switchover ACL entry matching a member path connected to a receiving port based on the receiving port and the destination MAC address of the data packet;

performing a hash calculation based on the data packet to obtain a hash value;

selecting one switchover member path from the matched switchover ECMPs based on the hash value.

9. An apparatus for traffic switchover, wherein the apparatus comprises a processor and a non-transitory machine-readable storage medium, wherein the non-transitory machine-readable storage medium has stored therein machine-executable instructions that can be executed by the processor, and the processor executes the machine-executable instructions to implement the following processes:

configuring each member path of Equal Cost Multi Paths (ECMPs) with switchover ECMPs that comprise other member paths of the ECMPs;

presetting a switchover Access Control List (ACL) entry for each member path; wherein a match item is a port connected to each member path and a specified Media Access Control (MAC) address; an action item is to send through the switchover ECMPs of each member path;

receiving a data packet with a destination MAC address being the specified MAC address through a member path;

selecting one switchover member path from the ECMPs to which the member path belongs;

determining a backbone node connected to the switchover member path as a next hop;

performing layer 3 forwarding on the data packet and encapsulating a MAC address of the next hop as a new destination MAC address; and sending the data packet with the new destination MAC address to the next hop through the switchover member path.

10. The apparatus of claim 9, wherein the processor executes the machine-executable instructions to select one switchover member path from the ECMPs to which the member path belongs by:

finding a switchover ACL entry matching a member path connected to a receiving port based on the receiving port and the destination MAC address of the data packet;

performing a hash calculation based on the data packet to obtain a hash value; and selecting one switchover member path from the matched switchover ECMPs based on the hash value.

* * * * *